United States Patent

Shimamoto et al.

[11] Patent Number: 6,147,712
[45] Date of Patent: Nov. 14, 2000

[54] FORMAT CONVERSION CIRCUIT AND TELEVISION RECEIVER PROVIDED THEREWITH AND METHOD OF CONVERTING VIDEO SIGNALS

[75] Inventors: Hidemitsu Shimamoto; Takashi Shinohara; Naoki Hayashi, all of Tokyo, Japan

[73] Assignee: Mitsubishi Denki Kabushiki Kaisha, Tokyo, Japan

[21] Appl. No.: 08/858,449

[22] Filed: May 19, 1997

[30] Foreign Application Priority Data

May 27, 1996 [JP] Japan .................................. 8-132016

[51] Int. Cl.[7] .............................. H04N 7/01; H04N 11/20
[52] U.S. Cl. .......................... 348/446; 348/441; 348/448; 348/452
[58] Field of Search ..................................... 348/446, 441, 348/448, 449, 452, 456, 459; H04N 7/01, 11/20

[56] References Cited

U.S. PATENT DOCUMENTS

| | | | |
|---|---|---|---|
| 3,747,087 | 7/1973 | Harrison, III et al. ................. | 348/239 |
| 5,101,273 | 3/1992 | Gillies et al. ............................ | 348/140 |
| 5,303,060 | 4/1994 | Iwamura et al. ........................ | 343/441 |
| 5,446,496 | 8/1995 | Foster et al. ............................ | 358/441 |
| 5,485,216 | 1/1996 | Lee ......................................... | 348/441 |
| 5,729,296 | 3/1998 | Rhodes ................................... | 348/441 |
| 5,757,435 | 5/1998 | Wells ...................................... | 348/441 |
| 5,757,967 | 5/1998 | Gonzales et al. ....................... | 382/233 |
| 5,835,150 | 11/1998 | Choi ....................................... | 348/441 |

FOREIGN PATENT DOCUMENTS 7-95490  4/1995  Japan .

*Primary Examiner*—Nathan Flynn
*Assistant Examiner*—Vivek Srivastava

[57] ABSTRACT

A format converter has a memory capable of storing a video signal of progressive or interlaced scan construction and having one of a plurality of video data sizes and one of a plurality of frame rates, a frame rate controller using the memory to control a frame rate of the video signal, and a conversion filter for converting a video data size of the video signal. With the above configuration, conversion of the signal is effected without losing or detracting the features of the source material of the video signal. The conversion of the video data size is preferably effected on the output having the frame rate adjusted. With the above configuration, the format of a video signal can be converted without degrading the quality of the input video signal, and at the same time the required memory capacity can be reduced.

22 Claims, 9 Drawing Sheets

TIME

TIME

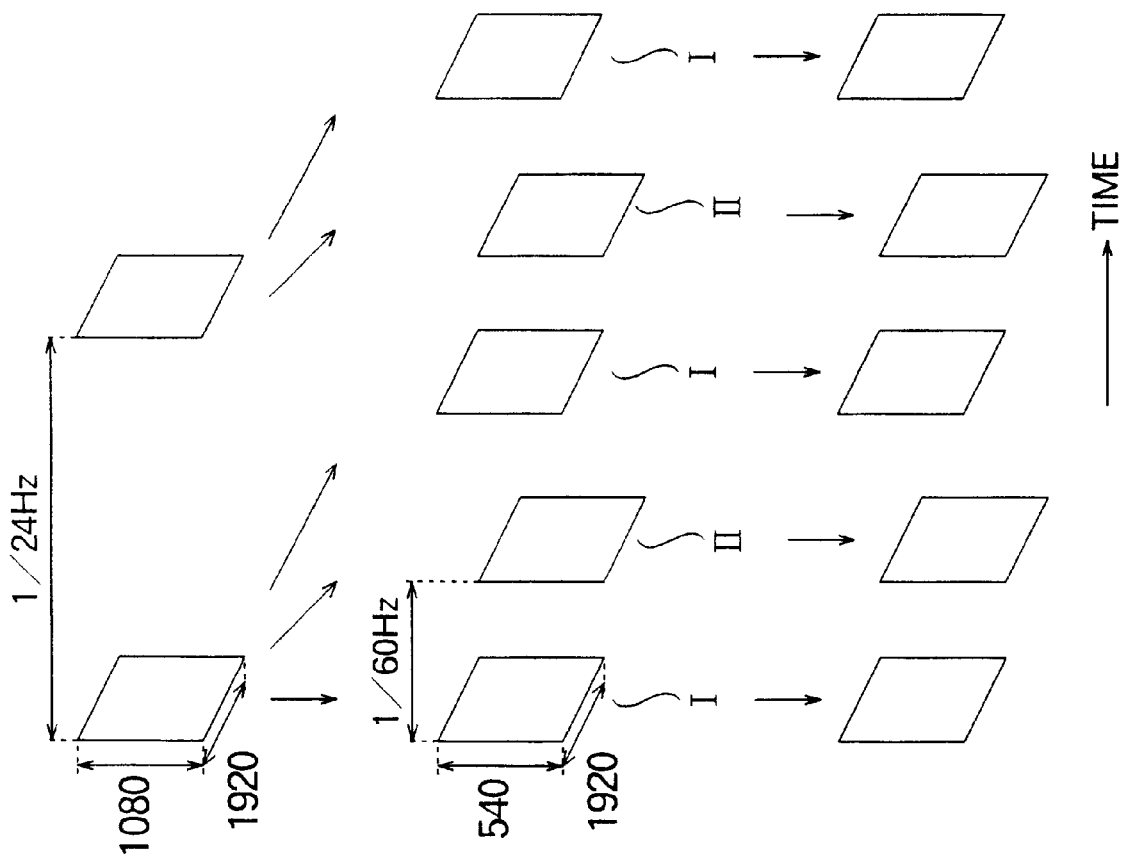

FORMAT CONVERSION CIRCUIT AND TELEVISION RECEIVER PROVIDED THEREWITH AND METHOD OF CONVERTING VIDEO SIGNALS

FIELD OF THE INVENTION

The invention relates to a television receiver which receives and displays a video signal such as a digital broadcasting signal of the next generation which utilizes a plurality of video formats for broadcasting or of a package medium such as a video tape, LD (laser disk), or DVD (digital video disk), and a format converter which is used in such a receiver.

BACKGROUND OF THE INVENTION

Conventional television broadcasting systems include NTSC, PAL, and SECAM systems, and terrestrial waves, cables, and satellites have been used for effecting the broadcasting. Each of of these broadcasts are based on a single standard or format for the broadcast signal. For example, the NTSC system which is adopted in Japan and the United States is stipulates to perform interlaced scanning, with a frame rate of 29.97 Hz and 525 scanning lines per frame. Accordingly, receivers can therefore be manufactured simply and at low costs.

On the other hand, with an advance in the image compression technology, a recent trend is to apply such compression technology to the television broadcasting, and the use of MPEG (Moving picture Expert Group) 2 standard, which is now an international standard, is being contemplated. The MPEG 2 standard provides a high level of freedom in data compression, allowing video signals having a variety of formats to be dealt therewith. For example, ATV broadcast, which is planned in the United States is expected to to adopt a number of video formats, which are combinations of 750 or 1,125 scan lines, frame rate of 23.98, 24, 29.97, 30, 59.94 or 60 HZ, and interlaced or progressive scanning. This has a significance that a broadcasting video signal can be delivered in a video format which is optimum to the source material. To give examples, a progressive scanning having 1,125 scan lines and a frame rate of 24 Hz may be used for a movie source material, a progressive scanning having 750 scan lines and a frame rate of 60 Hz may be used for an animation or computer graphics, and an interlaced scanning having 1,125 scan lines and a frame rate or 30 Hz may be used for camera-taken source material.

As mentioned previously, a conventional television receiver is designed for use with a single standard or format of a broadcast signal, and hence is not provided with a capability to receive and display video signals of broadcasting or of a package medium, which are supplied in various formats. If the receiver is provided with an auto-scan monitor which is designed to select a size and a frame rate which conform to a particular video format, there are disadvantages that such a monitor is generally expensive, and a receiver having a large screen is difficult to manufacture, thus presenting a difficulty in its use as a television receiver. In addition, there is a problem that a video signal having a low frame rate, when it is used directly in the display, is likely to flicker, and there is also another problem that it does not lend itself for use in a television receiver which is frequently used in a bright place.

SUMMARY OF THE INVENTION

An object of the invention is to provide a format converter which can convert the video signal without losing the features of the source material of the video signals received in various formats.

Another object of the invention is to reduce the required capacity of the memory used in the format conversion circuit.

According to the invention, there is provided a format converter comprising:
 a memory capable of storing a video signal for progressive scanning or interlaced scanning and having one of a plurality of video data sizes and one of a plurality of frame rates;
 a frame rate controller using the memory to control a frame rate of the video signal; and
 a conversion filter for converting a video data size of the video signal.

With the above configuration, conversion of the signal is effected without losing the features of the source material of the video signal.

It may be so arranged that the conversion filter receives the output produced as a result of the frame rate adjustment by means of said frame memory and said frame rate controller, whereby the conversion of the video data size is effected on the output having the frame rate adjusted.

With the above configuration, the format of a video signal can be converted without degrading the quality of the input video signal, and at the same time the required memory capacity can be reduced.

It may be so arranged that said frame rate controller adjusts the frame rate by repeatedly reading the frame which has been written, whereby the repeatedly read signal is repeatedly presented for display.

With the above configuration, a signal which is suitable for display by the monitor of the television receiver can be obtained by conversion without degrading the quality of the input video signal.

It may be so arranged that said frame rate controller adjusts the frame rate by dividing each frame into two fields.

With the above configuration, a signal which is suitable for display by the monitor of the television receiver can be obtained by conversion without degrading the quality of the input video signal.

According to another aspect of the invention, there is provided a format converter comprising:
 a memory capable of storing a video signal which is arranged in a block format;
 a frame rate controller for rearranging the video signal into a raster sequence arrangement and for controlling the frame rate; and
 a conversion filter for converting a video data size of the video signal.

With the above configuration, conversion of the signal is effected without losing the features of the source material of the video signal, and the required memory capacity can be reduced.

It may be so arranged that the frame rate controller uses the same memory for performing the control over the frame rate, which comprises repeated reading of a frame and separation into fields, and for rearranging the video signal from the block format arrangement to the raster sequence arrangement, using the same memory.

With the above configuration, the required memory capacity can be further reduced because the control over the frame rate and the rearrangement of the video signal are effected using a common memory, and the cost of the television receiver can be lowered.

The above described format converter may be incorporated in a television receiver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8A to FIG. 8C are schematic diagrams showing the operation of a television receiver according to a sixth embodiment of the invention.

DETAILED DESCRIPTION OF THE PREFERRED EMBODIMENTS

Embodiments of the invention will now be described with the reference to the drawings.

Figure 1:
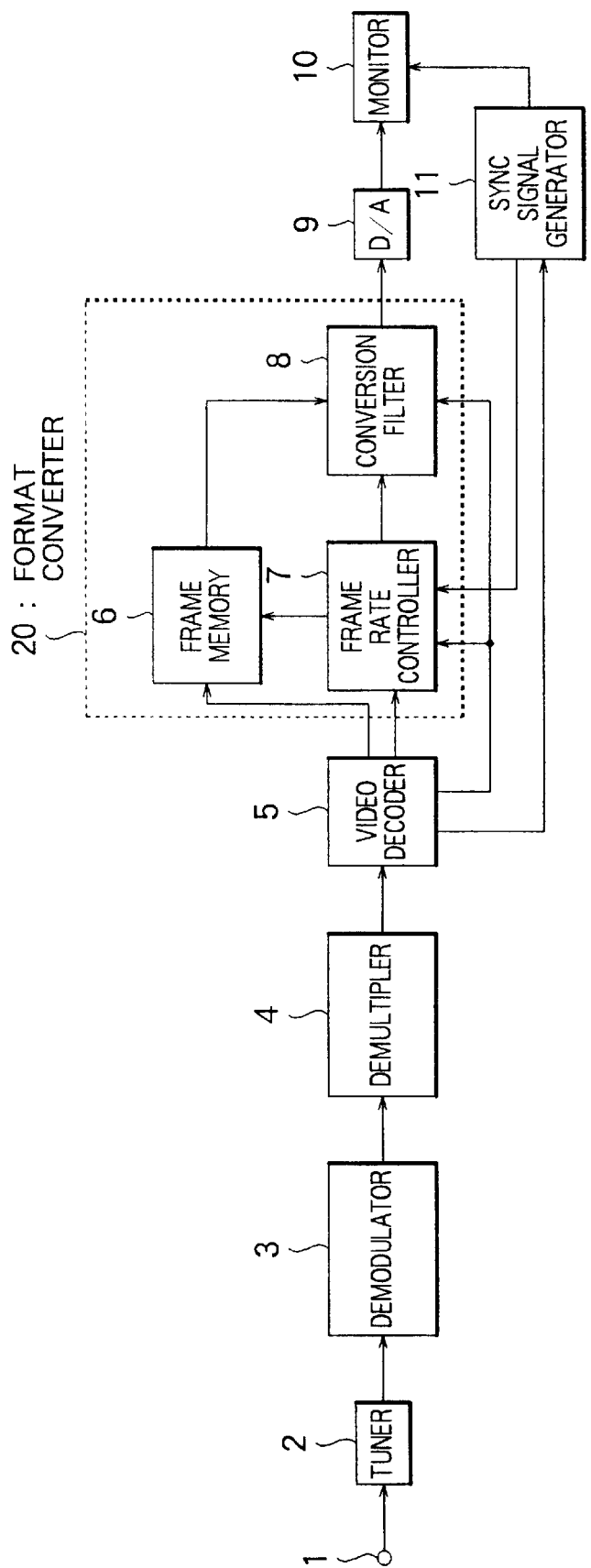
FIG. 1 is a block diagram of a television receiver according to a first embodiment of the invention.

FIG. 1 is a block diagram of a television receiver according to a first embodiment of the invention. The television receiver includes an input terminal 1 to which television signals received by an antenna or the like is input. The video signal received may be any one of a variety of formats. A tuner 2 selects, by tuning, a channel signal desired by a viewer from the signals received at the input terminal 1 by tuning. A demodulator 3 demodulates an output signal from the tuner 2 and delivers a multiplexed bit stream of MPEG 2 system Level. A demultiplexer 4 demultiplexes the multiplexed bit stream to produce a video stream, an audio stream and a stream or streams of additional information. The video stream which has been separated is output to a video decoder 5, which recovers an original video signal. A frame memory 6 has a capacity for one frame of a video signal is output from the video decoder 5. A frame rate controller 7 receives a synchronization information from the video decoder 5 and a sync signal generator 11 to be described later, and controls writing in and reading from the frame memory 6. A conversion filter 8 converts the video data size (number of scanning lines per picture and number of pixels per scanning line) of the video signal which is read from the frame memory 6. The frame memory 6, the frame rate controller 7 and the conversion filter 8 in combination form a format converter 20. A D/A converter 9 converts the output from the conversion filter 8 into an analog signal, which is displayed on a monitor 10. A sync signal generator 11 receives information relating to the format of the output video signal from the video decoder 5, and forms a sync signal anew. The sync signal is used for for the display at the monitor 10, and applied to the monitor 11 and the frame rate controller 7.

Figure 2:
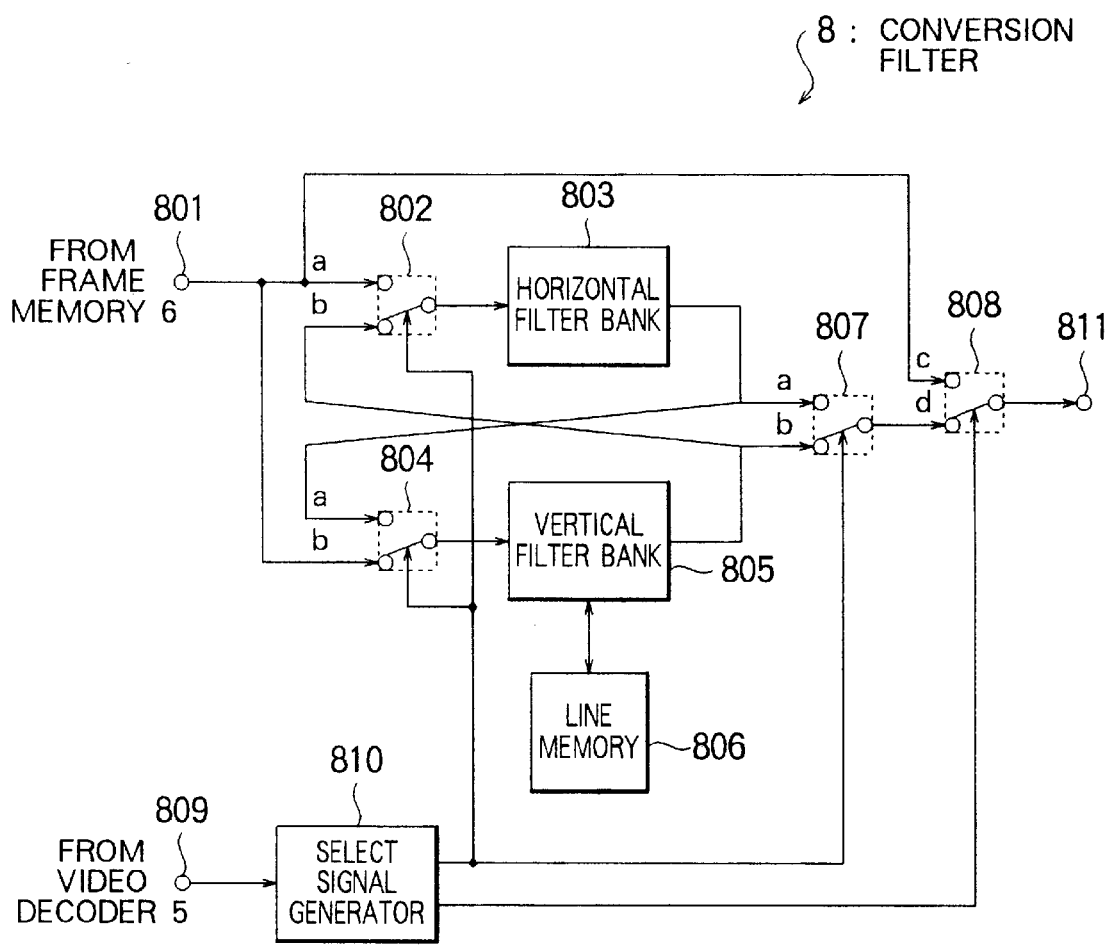
FIG. 2 is a block diagram showing the construction of a conversion fitter shown in FIG. 1.

FIG. 2 is a block diagram showing the construction of the conversion filter 8 shown in FIG. 1. Referring to FIG. 2, a video signal which is read out from the frame memory 6 is input to an input terminal 801, and is applied to a switch 802 which switches between the input terminal 801 and an output from a vertical filter bank 805 to be described later. A horizontal filter bank 803 is connected to the switch 802 and effects a conversion of the number of pixels per scanning line. A switch 804 switches between the input terminal 801 and an output from the horizontal filter bank 803, and is connected to a vertical filter bank 805 which effects a conversion of the number of scanning lines per picture. The vertical filter bank 805 is connected with a line memory 806. A switch 807 selects between outputs from the horizontal filter bank 803 and the vertical filter bank 805, and another switch 808 switches between outputs from the input terminal 801 and the switch 807. Format information (information relating to the format) of an output from the video decoder 5 is input to an input terminal 809, which is connected to a select signal generator 810, which receives the format information from the input terminal 809 and delivers a select signal to switches 802, 804, 807 and 808. An output terminal 811 is connected to the switch 808 and represents an output terminal of the conversion filter 8.

Description will be made of the operation which occurs when the received video signal supplied is of the progressive scan format having 1,280 pixels per horizontal line and 720 lines per picture and a frame rate of 30 Hz, and the monitor 10 is designed to operate on the basis of an interlaced scan format having a frame rate of 30 Hz, and 1,920 pixels per horizontal line and 1,080 lines per picture.

Figure 3A:
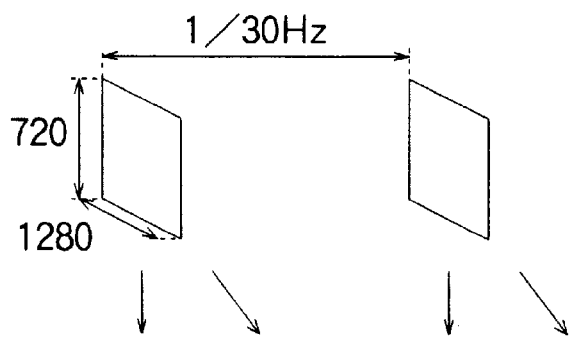
FIG. 3A to FIG. 3C are schematic diagrams showing the operation of the television receiver of the first embodiment.
Figure 3B:
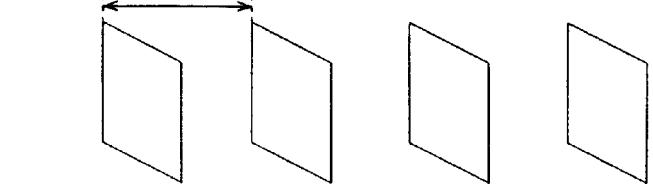
Figure 3C:
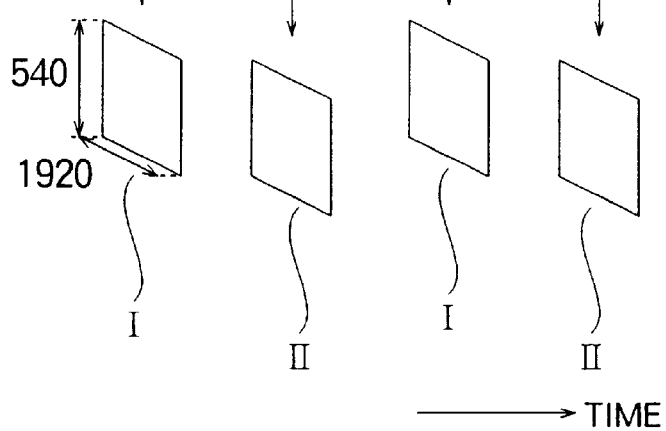

Video signals at the various parts of the format converter are shown in FIG. 3A to FIG. 3C. Specifically, FIG. 3A shows the video signal written into the frame memory 6, FIG. 3B shows the video signal read from the frame memory 6, and FIG. 3C shows the video signal output from the conversion filter 8. Reference marks "I" and "II" indicate first and second fields into which each frame is separated.

A video signal recovered by the video decoder 5 is delivered on the basis of PTS (presentation time stamp) which is described at a given location in the video stream, and is written into the frame memory 6 (FIG. 3A). At the same time, a format information including information on a video data size and a frame rate of this original picture is derived from a given location within the video stream, and is transmitted to the frame rate controller 7 and the conversion filter 8. The video signal having been written into the frame memory 6 is read from the frame memory 6 at a frame rate of 60 Hz on the basis of a sync signal from the sync signal generator 11 (FIG. 3B) and is delivered to the conversion filter 8. In the conversion filter 8, the format information which is applied to the terminal 809 is input to the select signal generator 810, thus producing select signals for the switches. Specifically, a select signal which selects a contact b is delivered to the switches 802, 804 and 807 while a select signal which selects a contact d is delivered to the switch 808. The video signal which is applied to the switch 804 is input to the vertical filter bank 805 where the video signal of the progressive scanning format having 720 lines per frame is converted into a video signal of the interlaced scanning format having 540 lines per field, by dividing each frame of the video signal of the progressing scanning format into video signals of an odd-numbered field and an even-numbered field. An output from the vertical filter bank 805 is then input to the switch 802 to be applied to the horizontal filter bank 803 where the number of pixels per scanning line is converted into 1,920. The conversion of the number of pixels aid the conversion of the number of scanning lines are easily implemented by means of a sampling frequency conversion filter which comprises a combination of interpolation filters.

An output from the horizontal filter bank 803 is fed through the switches 807 and 808 to the output terminal 811, and then delivered, as an output from the conversion filter 8 (FIG. 3C), to the D/A converter 9 to be converted into an analog signal. Since the analog video signal conforms to the display scheme of the monitor 10, it can be displayed directly without requiring any adjustment in the deflection circuit or the like. It is to be noted that reading operation from the frame memory 6 is effected at a rate twice the rate at which the writing operation is effected.

As another example (second embodiment), it is assumed that the received video signal is of the interlaced scan format having 1,920 pixels per horizontal line, 1,080 lines per picture and a frame rate of 30 Hz, and the monitor is designed to operate in the progressive scan scheme having a frame rate of 60 Hz, 1,280 pixels per horizontal line and 720 lines per picture.

Figure 4A:
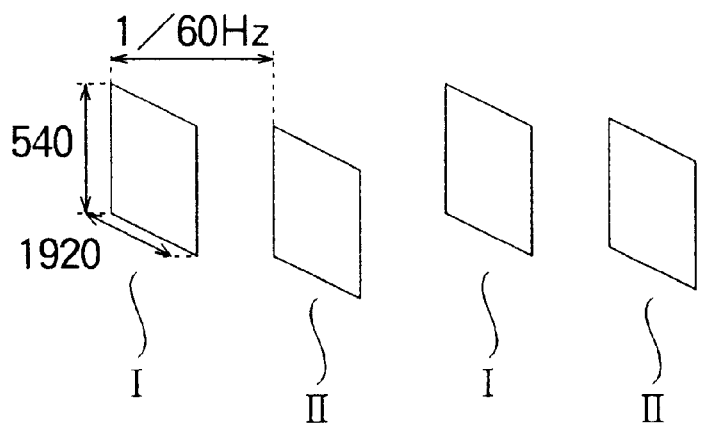
FIG. 4A to FIG. 4C are schematic diagrams showing the operation of the television receiver of the second embodiment.
Figure 4B:
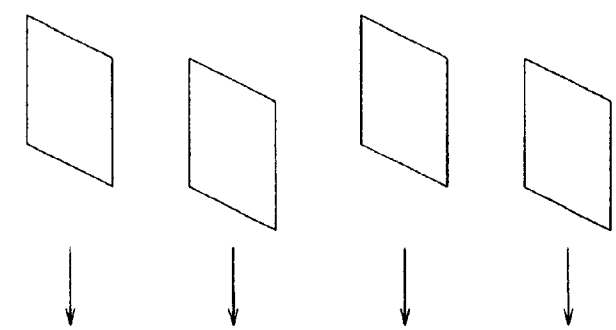
Figure 4C:
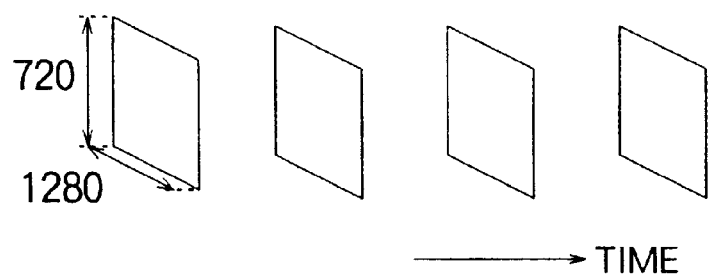

Video signals at the various parts of the format converter are shown in FIG. 4A to FIG. 4C. Specifically, FIG. 4A shows the video signal written into the frame memory 6, FIG. 4B shows the video signal read from the frame memory 6, and FIG. 4C shows the video signal output from the conversion filter 8. Reference marks "I" and "II" indicate first and second fields of each frame.

The received signal is written into the frame memory 6 (FIG. 4A), arid is then read from the frame memory 6 at a field rate of 60 Hz on the basis of a sync signal from the sync signal generator 11 (FIG. 4B), and is delivered to the conversion filter 8. In the conversion filter 8, format information applied to the terminal 809 is fed to the select, signal generator 810, which produces select signals for the respective switches. Specifically, a select signal which selects a contact a is delivered to the switches 802, 804 and 807 while a select signal which selects a contact d is delivered to the switch 808. A video signal which is applied to the switch 802 is converted by the horizontal filter bank 803 so as to contain 1,280 pixels per horizontal line. An output from the horizontal filter bank 803 is then input to the vertical filter bank 805 where a conversion of the number of scanning lines takes place so that the original video signal having having 540 lines per field is converted into a signal of progressive scan having 720 lines per frame. That is, each of the odd-numbered and even-numbered fields having 540 lines is converted into a frame having 720 lines. An output from the vertical filter bank 805 is fed to the output terminal 811, from where it is delivered, as an output from the conversion filter 8 (FIG. 4C), to the D/A converter 9 to be converted into an analog signal for display.

As a third embodiment, it is assumed that the received video signal is of the progressive scan format having a frame rate or 30 Hz, 1,080 lines per picture and 1,920 pixels per horizontal line, and the monitor 10 is designed to operate on the interlaced scan scheme having a frame rate of 30 Hz, 1,080 lines per picture and 1,920 pixels per horizontal line.

Figure 5A:
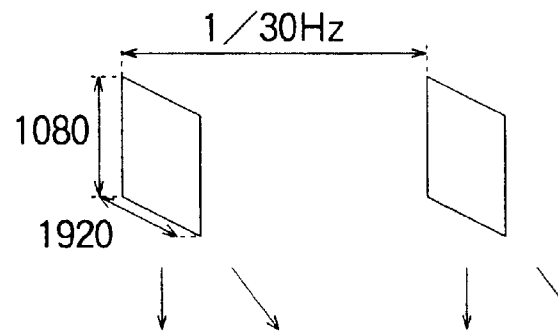
FIG. 5A to FIG. 5C are schematic diagrams showing the operation of a television receiver according to a third embodiment of the invention.
Figure 5B:
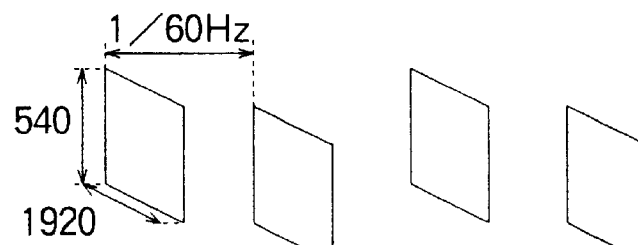
Figure 5C:
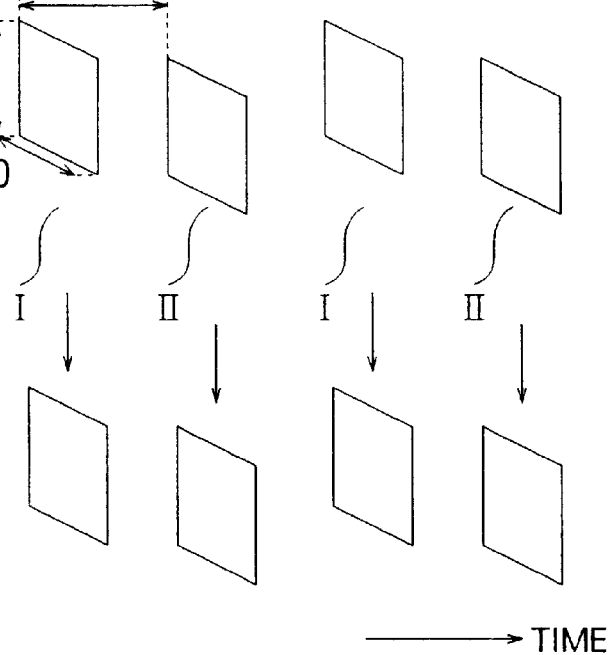

Video signals at the various parts of the format converter are shown in FIG. 5A to FIG. 5C. Specifically, FIG. 5A shows the video signal written into the frame memory 6, FIG. 5B shows the video signal read from the frame memory 6, and FIG. 5C shows the video signal output from the conversion filter 8. Reference marks "I" and "II" indicate first and second fields into which each frame is separated.

A received signal is written into the frame memory 6 (FIG. 5A), and is read therefrom at a field rate of 60 Hz. Each frame of the video signal having been written into the frame memory 6 is separated into an odd-numbered field and an even-numbered field. The writing and reading are effected in accordance with the sync signal from the sync signal generator 11 (FIG. 5B). The video signal having been read from the frame memory 6 is delivered to the conversion filter 8.

In the conversion filter 8, the format information which is input to the terminal 809 is fed to the select signal generator 810, which delivers a select signal which selects a contact c to the switch 808. Accordingly, a video signal which is input to the switch 802 is directly fed to the switch 808 without passing any filter, and is delivered, as an output from the conversion filter 8 (FIG. 5C), to the D/A converter 9 where it is converted into an analog signal for display.

According to the teaching of the above embodiment, and by using the frame memory 6 having a capacity of 1,080 each containing 1,920 pixels, the television receiver can be configured to operate selectively in any of the modes described with reference to FIG. 3, FIG. 4 and FIG. 5 simply by switching the frame rate controller 7.

Description will next be made of a fourth embodiment in which the received video signal has a progressive scan format having a frame rate of 30 Hz, 1,080 lines per picture and 1,920 pixels per horizontal line, and the monitor 10 is designed to operate on the basis of a progressive scan scheme at a frame rate of 60 Hz and having 720 lines per picture and 1,280 pixels per horizontal line.

Figure 6A:
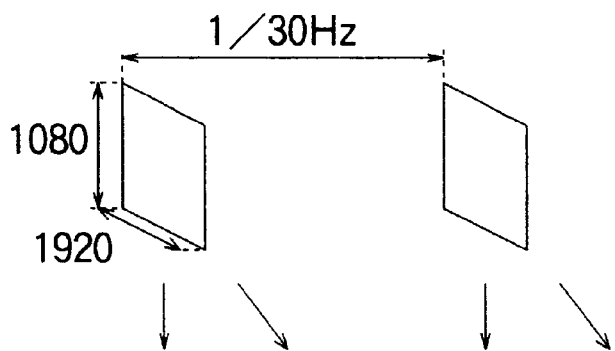
FIG. 6A to FIG. 6C are schematic diagrams showing the operation of a television receiver according to a fourth embodiment of the invention.
Figure 6B:
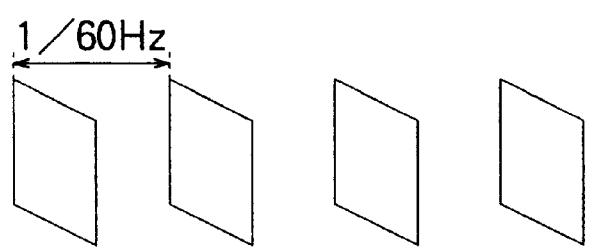
Figure 6C:
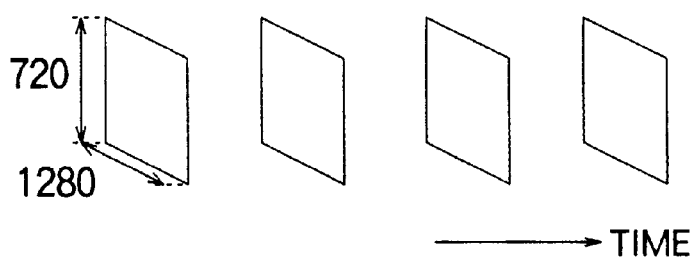

Video signals at the various parts of the format converter are shown in FIG. 6A to FIG. 6C. Specifically, FIG. 6A shows the video signal written into the frame memory 6, FIG. 6B shows the video signal read from the frame memory 6, and FIG. 6C shows the video signal output from the conversion filter 8.

A video signal which has been written into the frame memory 6 (FIG. 6A) is read therefrom at a frame rate of 60 Hz in accordance with the sync signal from the sync signal generator 11 (FIG. 6B) and is delivered to the conversion filter 8. In the conversion filter 8, the format information which is input to the terminal 809 is fed to the select signal generator 810, which produces select signals for the respective switches. Specifically, a select signal which selects a contact a is delivered to the switches 802, 804 and 807 while a select signal which selects a contact d is delivered to the switch 808. A video signal which is input to the switch 802 is fed to the horizontal filter bank 803 where the number of pixels per horizontal scanning line is converted into 1,280. An output from the horizontal filter bank 803 is fed to the vertical filter bank 805 where the number of scanning lines per frame is converted from 1,080 to 720. An output from the vertical filter bank 805 is fed to the output terminal 811, and is delivered, as an output from the conversion filter 8 (FIG. 6C), to the D/A converter 9 where it is converted into an analog signal for display.

When the length of data word is doubled, the reading rate from the memory 6 can be reduced, and by by providing two horizontal filter banks 803 connected in parallel, the rate of processing operation can be reduced. The reading operation from the frame memory 6 is effected at a rate twice that of the writing operation.

Description will next be given of a fifth embodiment in which it is assumed that the received video signal is of a progressive scan format having a frame rate of 30 Hz, 720 lines per picture and 1,280 pixels per horizontal line, while the monitor 10 is designed to operate on the progressive scan scheme having a frame rate of 60 Hz, 720 lines per picture and 1,280 pixels per horizontal line.

Figure 7A:
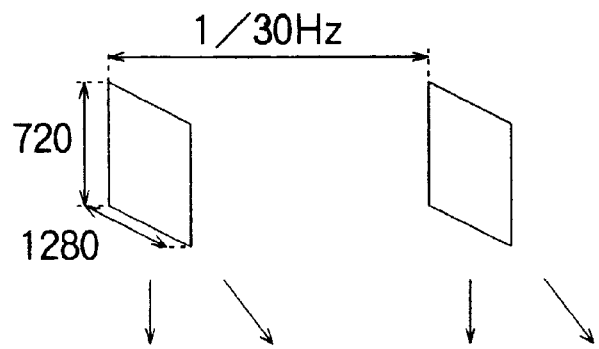
FIG. 7A to FIG. 7C are schematic diagrams showing the operation of a television receiver according to a fifth embodiment of the invention.
Figure 7B:
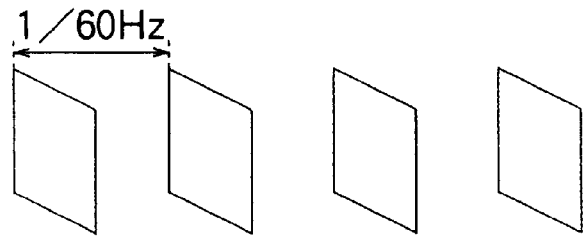
Figure 7C:
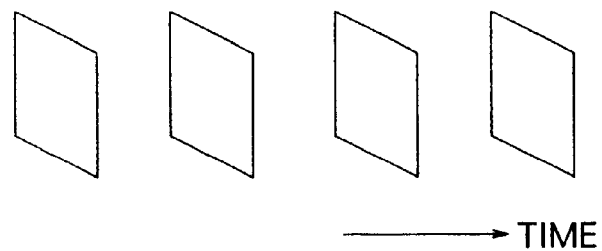

Video signals at the various parts or the format converter are shown in FIG. 7A to FIG. 7C. Specifically, FIG. 7A shows the video signal written into the frame memory 6, FIG. 7B shows the video signal read from the frame memory 6, and FIG. 7C shows the video signal output from the conversion filter 8.

A video signal which has been written into the frame memory 6 (FIG. 7A) is read therefrom at a frame rate of 60 Hz on the basis of the sync signal from the sync signal generator 11 (FIG. 7B) and is delivered to the conversion filter 8. In the conversion filter 8, the format information which is input to the terminal 809 is fed to the select signal generator 810, which produces a select signal for the switch 808, this select signal being effective to select the terminal c. A video signal which is input to the switch 802 is fed to the switch 808 without passing through any filter, and is delivered directly, as an output from the conversion filter (FIG. 7C), to the D/A converter 9 where it is converted into an analog signal.

The reading operation from the frame memory 6 is effected at a rate twice that for the writing operation, and the same frame of the video signal having been written in the frame memory 6 is repeatedly read twice, and is presented to a viewer as two consecutive frames at the monitor 10.

Description will next be given of a sixth embodiment in which it is assumed that the received video signal is of the progressive scan format which has a frame rate of 24 Hz, 1,080 lines per picture and 1,920 pixels per horizontal line, and the monitor 10 is designed to operate on the basis of the interlaced scan scheme which has a frame rate of 30 Hz, 1,080 lines per picture and 1,920 pixels per horizontal line.

Video signals at the various parts of the format converter are shown in FIG. 8A to FIG. 8C. Specifically, FIG. 8A shows the video signal written into the frame memory 6, FIG. 8B shows the video signal read from the frame memory 6, and FIG. 8C shows the video signal output from the conversion filter 8. Reference marks "I" and "II" indicate first and second fields of each frame.

A video signal which has been written into the frame memory 6 (FIG. 8A) is read at a field rate of 60 Hz, alternately forming an odd-numbered field and an even-numbered field, on the basis of the sync signal from the sync signal generator 11 (FIG. 8B), and is delivered to the conversion filter 8. In the conversion filter 8, the format information which is input to the terminal 809 is fed to the select signal generator 810, which delivers a select signal selecting the terminal c to the switch 808. Accordingly, a video signal which is input to the switch 802 is directly fed to the switch 808 without passing through any filter, and is then delivered, as an output from the conversion filter 8 (FIG. 8C), to the D/A converter 9 where it is converted into an analog signal for display.

Frames of the video signal having been written into the frame memory 6 are read twice or three times, alternately, to form two or three fields of the video signal, respectively. That is, each of alternating frames of the video signal having been written is read twice to form two fields, while each of the intervening frames of the video signal having been written is read three times to form three fields. It is so configured that no passing-over of the writing-operation by the reading operation occur, and orderly operation is achieved. When reading from the memory 6 takes place three times, the field which is initially read is read again. In addition, in order to secure the continuity of fields, the sequence in which the fields are read is not fixed. In other words, it is ensured that the odd-numbered fields and even-numbered fields are read alternately.

Figure 9:
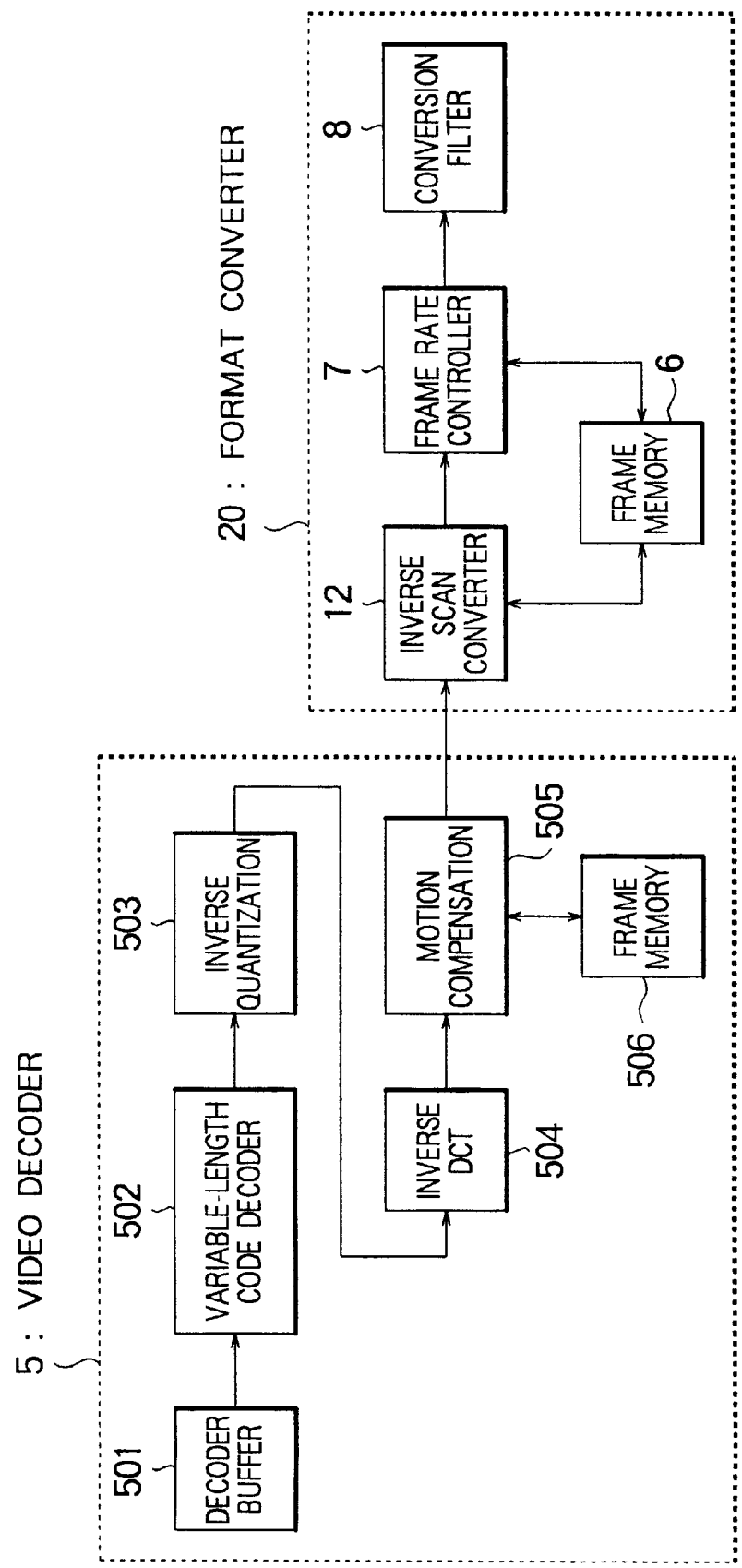
FIG. 9 is a block diagram of a television receiver according to a seventh embodiment of the invention.

FIG. 9 is a block diagram of a video decoder 5 and a format converter 20 in a television receiver according to a a seventh embodiment of the invention. As illustrated, the video decoder 5 of this embodiment comprises a decoder buffer 501 which receives a video stream output from the multiplexer 4, and a variable-length code decoder 502 which extracts and decodes a portion of an output from the decoder buffer 501 which has been variable-length encoded. An inverse quantization circuit 503 produces an approximate values of DCT coefficients from the output of the decoder 502. An inverse DCT circuit 504 recovers a signal corresponding to the original picture from the reproduced DCT coefficients. A compensation circuit 505 uses a reference picture formed in a frame memory 506, to be described later, to reproduce an original video signal by providing a motion compensation. The frame memory 506 stores a reference image which is used in the motion compensation circuit 505.

The format converter 20 of this embodiment comprises an inverse scan converter 12 which receives the output of the motion compensation circuit 505, and rearranges the signals for the respective pixels in each of the DCT blocks into the order of scanning for display. A frame memory 6, a frame rate controller 7, and a conversion filter 8 are similar to those in FIG. 1.

With the embodiment of FIG. 9, a video signal which is reproduced by effecting motion compensation is delivered from the video decoder 5 in the sequence of DCT, i.e., arranged in a block format, and is rearranged by the inverse scan converter 12 and is written into the frame memory 6 in the arrangement which is suitable for subsequent reading in the sequence of scanning for display, in the other words, in the raster sequence arrangement. The video signal in the frame memory 6 is read by the frame rate controller 7 in accordance with the input format and the display monitor, in the manner described in connection with the earlier described embodiments. The video data size is converted by the conversion filter 8. With this configuration, it is possible to display an optimum picture without the provision of a special memory which is devoted for the inverse scan conversion and without requiring an adjustment of a deflection circuit or the like. In addition, repeated reading of each frame and separation into fields can be effected at the same memory.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A format converter comprising:
    a frame memory capable of storing a video signal for both progressive scanning and interlaced scanning and having one of a plurality of video data sizes and one of a plurality of frame rates;

a frame rate controller controlling reading of the video signal out of said frame memory and controlling writing of the video signal into said frame memory thereby controlling a frame rate of the video signal; and a conversion filter for converting a video data size of the video signal;

said frame rate controller and said frame memory increasing the frame rate of the video signal in response to a control signal;

said frame rate controller and said frame memory decreasing the frame rate of the video signal in response to the control signal;

wherein the same said frame memory and the same said frame rate controller are used for both increasing and decreasing the frame rate of the video signal, said conversion filter including:

an input terminal operatively connected to said frame memory and receiving the video signal from said frame memory;

an output terminal for outputting a converted video signal;

a horizontal filter bank converting a number of pixels per scanning line;

a vertical filter bank converting a number of scanning lines per picture;

a switch device operatively connected to said input terminal, said output terminal, said horizontal filter bank and said vertical filter bank, said switch device selectively supplying a signal at said input terminal or a signal at an output of said vertical filter bank to an input of said horizontal filter bank;

said switch device selectively connecting said input terminal or an output of said horizontal filter bank to an input of said vertical filter bank;

said switch device selectively connecting the output of said horizontal filter bank, the output of said vertical filter bank, or the input to said output terminal; and a select signal generator having an input operatively connected to a second input terminal receiving format information and having control signal outputs operatively connected to said switch device, said select signal generator generating control signals to control said switch device to provide a desired video data size according to the format information.

2. The format converter according to claim 1, in which said conversion filter receives the output produced as a result of the frame rate adjustment via said frame memory and said frame rate controller, whereby the conversion of the video data size is effected on the output having the frame rate adjusted.

3. The format converter according to claim 2, in which said frame rate controller adjusts the frame rate by repeatedly reading the frame which has been written, whereby the repeatedly read signal is repeatedly presented for display.

4. The format converter according to claim 3, in which said frame rate controller adjusts the frame rate by dividing each frame into two fields, in combination with the repeated reading.

5. The format converter according to claim 2, in which said frame rate controller adjusts the frame rate by dividing each frame into two fields.

6. A television receiver including said format converter according to claim 1.

7. A format converter comprising:

a frame memory capable of storing a video signal which is arranged in a block format;

a frame rate controller for rearranging the video signal into a raster sequence arrangement;

said frame rate controller controlling reading of the video signal out of said frame memory and controlling writing of the video signal into said frame memory thereby controlling the frame rate; and a conversion filter for converting a video data size of the video signal, wherein the same said frame memory and the same said frame rate controller are used for both rearranging the video signal from the block format into the raster sequence arrangement and for controlling the frame rate.

8. The format converter according to claim 7, in which said frame rate controller uses the same said frame memory for performing the control over the frame rate, by repeated reading of a frame and separation into two fields.

9. The format converter according to claim 7, in which said conversion filter receives the output produced as a result of the frame rate adjustment via said frame memory and said frame rate controller, whereby the conversion of the video data size is effected on the output having the frame rate adjusted.

10. The format converter according to claim 9, in which said frame rate controller adjusts the frame rate by repeatedly reading the frame which has been written, whereby the repeatedly read signal is repeatedly presented for display.

11. The format converter according to claim 10, in which said frame rate controller adjusts the frame rate by dividing each frame into two fields, in combination with the repeated reading.

12. The format converter according to claim 9, in which said frame rate controller adjusts the frame rate by dividing each frame into two fields.

13. A television receiver including said format converter according to claim 7.

14. A method of converting a video signal comprising:

obtaining a video signal arranged in a block format and containing a video data size information and a frame rate information for the video signal, inverse scan converting the block format video signal to a raster sequence arranged video signal by writing the block format video signal to a frame memory in an arrangement which is suitable for subsequent reading in the raster sequence arrangement, transmitting the video data size information and the frame rate information to a frame rate controller and a conversion filter, adjusting the frame rate of the raster sequence arranged video signal with the frame rate controller and the frame memory to obtain a frame-rate-adjusted video signal, and converting the video data size of the video signal to a desired format with the conversion filter, wherein said inverse scan converting, said writing, said adjusting the frame rate, and said converting the video data size steps all utilize the same said frame memory.

15. The method according to claim 14, wherein said adjusting step includes:

controlling reading and writing of the video signal to/from the frame memory.

16. The method according to claim 15, wherein said adjusting step further includes:

dividing a frame of the video signal into two fields.

17. The method according to claim 14, wherein said conversion step includes:

converting the video data size of the frame-rate-adjusted video signal.

18. The method according to claim 17, wherein said adjusting step includes:

controlling reading and writing of the video signal to/from the frame memory.

19. The method according to claim 18, wherein said adjusting step further includes:

dividing a frame of the video signal into two fields.

20. The format converter according to claim 7, said frame rate controller and said frame memory increasing the frame rate of the video signal in response to a control signal, and said frame rate controller and said frame memory decreasing the frame rate of the video signal in response to the control signal, wherein the same said frame memory and the same said frame rate controller are used for both increasing and decreasing the frame rate of the video signal.

21. The format converter according to claim 1, said conversion filter including:

an input terminal operatively connected to said frame memory and receiving the video signal from said frame memory;

a horizontal filter bank converting a number of pixels per scanning line;

a vertical filter bank converting a number of scanning lines per picture;

said switch device including a first switch operatively connected to said input terminal, said vertical filter bank and said horizontal filter bank, said first switch switching between inputs from said input terminal and said vertical filter bank to supply an output to said horizontal filter bank;

a second switch operatively connected to said input terminal, said horizontal filter bank and said vertical filter bank, said second switch switching between inputs from said input terminal and said horizontal filter bank to supply an output to said vertical filter bank;

a third switch operatively connected to said horizontal filter bank and said vertical filter bank, said third switch switching between inputs from said horizontal filter bank and said vertical filter bank to supply an output;

a fourth switch operatively connected to said third switch and to said input terminal, said fourth switch switching between the output of said third switch and an input from said input terminal to supply a converted video signal to said output terminal; and a select signal generator having an input operatively connected to a second input terminal receiving format information and having control signal outputs operatively connected to said first, second, third and fourth switches, said select signal generator generating control signals to control said first, second, third, and fourth switches to provide a desired video data size according to the format information.

22. The format converter according to claim 7, said conversion filter including:

an input terminal operatively connected to said frame memory and receiving the video signal from said frame memory;

a horizontal filter bank converting a number of pixels per scanning line;

a vertical filter bank converting a number of scanning lines per picture;

a first switch operatively connected to said input terminal, said vertical filter bank and said horizontal filter bank, said first switch switching between inputs from said input terminal and said vertical filter bank to supply an output to said horizontal filter bank;

a second switch operatively connected to said input terminal, said horizontal filter bank and said vertical filter bank, said second switch switching between inputs from said input terminal and said horizontal filter bank to supply an output to said vertical filter bank;

a third switch operatively connected to said horizontal filter bank and said vertical filter bank, said third switch switching between inputs from said horizontal filter bank and said vertical filter bank to supply an output;

a fourth switch operatively connected to said third switch and to said input terminal, said fourth switch switching between the output of said third switch and an input from said input terminal to supply a converted video signal; and a select signal generator having an input operatively connected to a second input terminal receiving format information and having control signal outputs operatively connected to said first, second, third and fourth switches, said select signal generator generating control signals to control said first, second, third, and fourth switches to provide a desired video data size according to the format information.

* * * * *